United States Patent [19]
Helgesen

[11] 4,107,904
[45] Aug. 22, 1978

[54] MACHINE FOR LOADING FISH IN BOXES

[75] Inventor: Willy Helgesen, Madla, Norway

[73] Assignee: Trio Engineering Ltd., Forus, Norway

[21] Appl. No.: 809,400

[22] Filed: Jun. 23, 1977

[30] Foreign Application Priority Data

Jun. 24, 1976 [NO] Norway .............................. 762182

[51] Int. Cl.² ........................ B65B 5/08; B65B 25/00
[52] U.S. Cl. ........................................ 53/142; 53/159; 53/247; 53/252; 198/477; 198/484
[58] Field of Search ............... 53/142, 143, 154, 159, 53/160, 247, 248, 251, 252; 198/424, 477–479, 482, 484, 597, 599, 637, 678

[56] References Cited

U.S. PATENT DOCUMENTS

| 2,326,146 | 8/1943 | Kurzbin | 53/142 |
| 2,382,729 | 8/1945 | Kurzbin | 53/142 |
| 3,104,756 | 9/1963 | Walker | 198/479 |
| 3,451,191 | 6/1969 | Eriksen | 53/142 |

FOREIGN PATENT DOCUMENTS

| 101,382 | 2/1963 | Norway | 53/142 |

*Primary Examiner*—Robert Louis Spruill
*Attorney, Agent, or Firm*—Kenyon & Kenyon, Reilly, Carr & Chapin

[57] ABSTRACT

Machines for loading fish in boxes having a first conveyor supporting a series of transport containers and serving to transfer fish sideways while each is disposed in its respective transport container in a preselected position with the heads of fish in adjacent containers facing in opposite directions and the bellies directed upwards. The fish transfer is made from one or a pair of cooperating feeders to a second conveyor having a series of catch devices adapted to engage their respective fish and effect transfer thereof to an associated box for deposition therein. The two conveyors are arranged to be driven at a uniform speed in a continuous circulatory movement. The relative disposition of the conveyors is such that local regions of the paths of movement of the catch devices and the transport containers coincide enabling the catch devices to engage their respective fish in the transport containers one after the other. The fish are retained on the second conveyor in groups between corresponding groups of catch devices by means of cooperating, co-travelling check elements within a pre-selected region of the path of movement of the second conveyor between a first position in which the fish are lightly clamped together between the catch devices and a second position in which a group of fish can be transferred to its associated box.

18 Claims, 4 Drawing Figures

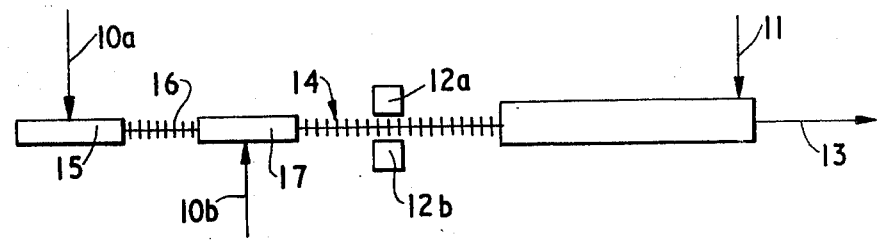
-FIG.1.-
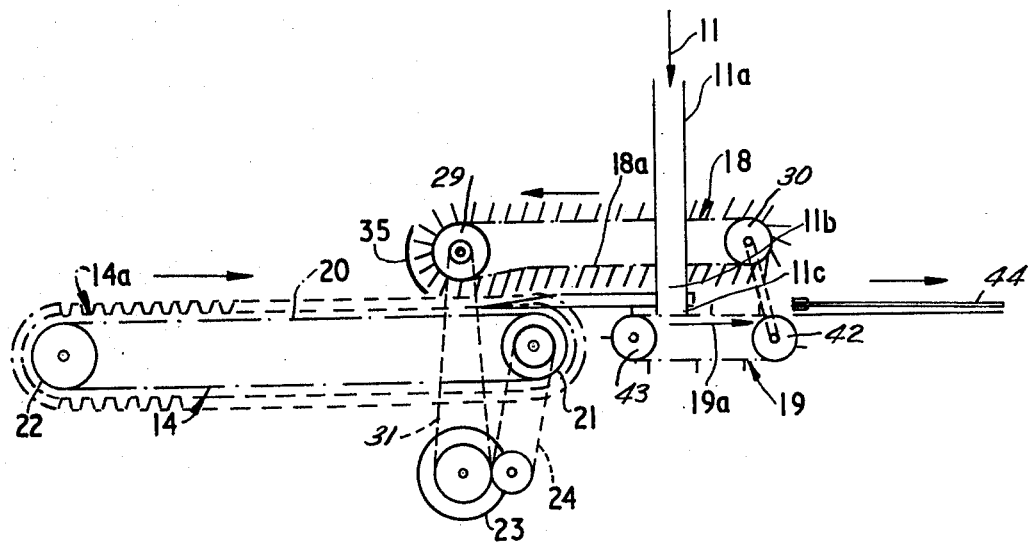
-FIG.2.-

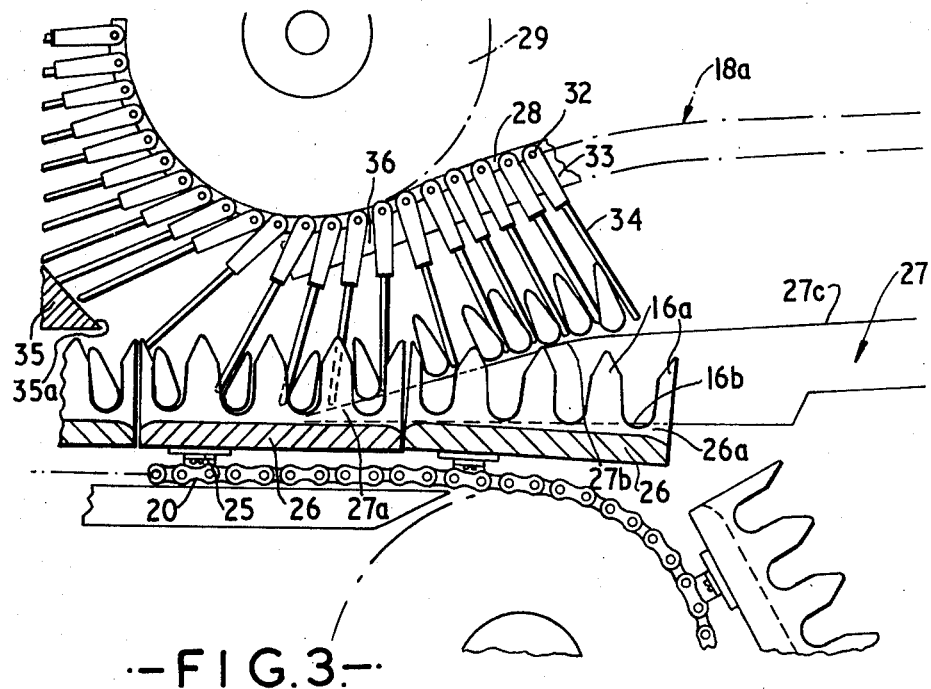
-FIG.3-
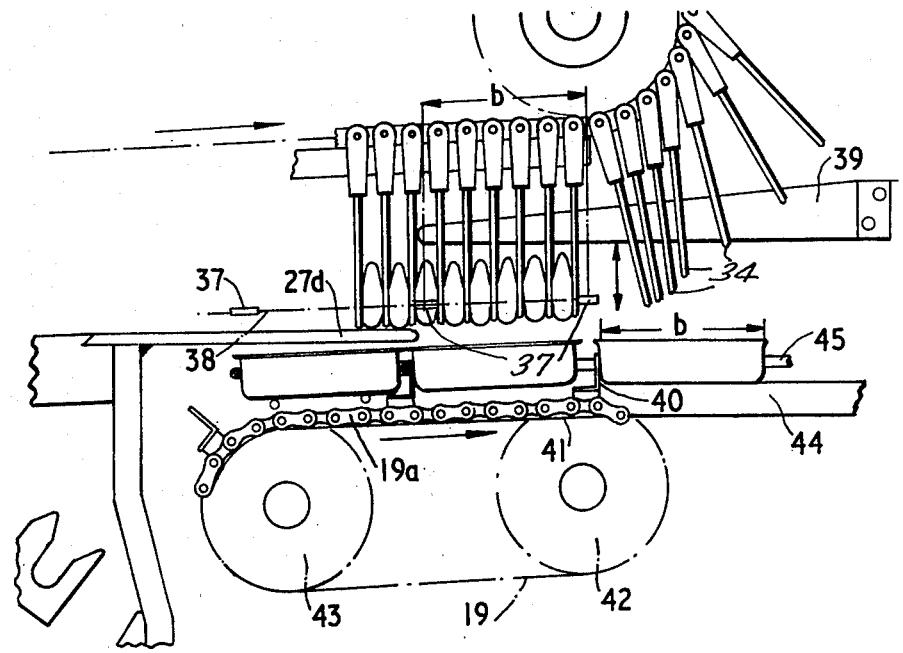
-FIG.4-

MACHINE FOR LOADING FISH IN BOXES

This invention relates to machines for loading fish in boxes.

The machines according to the invention are primarily designed for the deposition in boxes of raw, untreated or partially treated fish. It is especially appropriate to deposit in boxes raw, beheaded and tailed fish. However, these machines can also be used, if necessary, for depositing treated fish in boxes, for example, hot smoked fish. They are especially designed for depositing small fish, such as brisling, small herring, herring and similar fish, in a single layer in each box. However, the loading of fish in two or more layers can also be carried out with these machines.

Various types of fish-depositing machines are known, for example, such as illustrated in Norwegian Patent Nos. 101,382 and 107,896, where the transfer of fish to boxes is carried out by intermittent operation, that is to say by a reciprocating movement of fish-gripping means, which catch hold of a group of fish on a supply conveyor and transfer this group of fish directly to boxes. It has been found that with known fish-depositing machines, it has been difficult to achieve a speed of more than 20 boxes per minute. This is due, in the main, to the limitations of the reciprocating fish-gripping means. If one tries to increase the capacity, this goes beyond the accuracy of the depositing operation with, as a result thereof, reduced quality of raw material and end product.

With the present invention, the aim is to increase the capacity by a significant degree without thereby reducing the accuracy of the loading operation or reducing the quality of the raw material or the end product.

According to the present invention a machine for loading fish in boxes comprises a first conveyor supporting a series of transport containers thereon and serving to transfer fish sideways while each is disposed in its respective transport container in a preselected position with the heads of fish in adjacent containers facing in opposite directions and the bellies directed upwards; said fish transfer being made from one or a pair of cooperating feed means to a second conveyor having a series of catch devices adapted to engage their respective fish and effect transfer thereof to an associated box for deposition therein. The first and second conveyors are arranged to be driven at a uniform speed in a continuous circulatory movement, the relative disposition of the conveyors being such that a local region of the path of movement of the catch devices of the second conveyor coincides with a local region of the path of movement of the transport containers of said first conveyor enabling the catch devices to engage their respective fish in their respective transport containers one after each other. The fish are retained on the second conveyor in groups between corresponding groups of catch devices by means of cooperating, co-travelling check elements within a preselected region of the path of movement of the second conveyor between a first position in which the fish are lightly clamped together between the catch devices and a second position in which a group of fish can be transferred to the associated box.

By means of the machines of the present invention, it is possible to increase the capacity from about 20 boxes per minute as achieved by conventional means to, for example, 60-80 boxes per minute, without thereby reducing the quality of the raw material or the finished product.

In order that the invention can be more clearly understood, a convenient embodiment thereof will now be described, by way of example, with reference to the accompanying drawings, in which:

FIG. 1 is a schematic view of a machine for loading fish in boxes,

FIG. 2 is a side view of the machine of FIG. 1 with certain portions indicated schematically.

FIG. 3 is an enlarged partial side view, partly in section, showing a transfer location between first and second conveyors of the machine, and FIG. 4 is another enlarged partial side view showing the transfer location between the second conveyor and a subsequent box conveyor of the machine.

Referring to FIG. 1, the fish are introduced into the machine via two branch paths 10a, 10b while the boxes are introduced into the machine via a box guide 11. By reference numerals 12a and 12b, there are illustrated two cooperating head- and tail-cutting apparatuses. Fish which are desposited in boxes are conveyed away on a transport track 13.

Raw fish (brisling, small herring or herring) are employed as the starting material. By means of a thickness sorting in a sorting apparatus (not shown), the fish are sorted out by a size corresponding to a loading of, for example, 10 fish per box in a single box layer.

From the sorting apparatus, the sorted fish are led to a unidirectional apparatus, for example, of the type which is shown in Norwegian Patent No. 103,357 so that each and all the fish is brought into a position with the head directed the same way.

From the unidirectional apparatus, the similarly facing fish are led to a turning apparatus so that all the fish are brought into a position with the back turned downwards and the belly turned upwards. In this last-mentioned position, the fish are fed in the two branch paths 10a, 10b to a first conveyor 14 of the depositing machine.

The fish are fed in groups, in a manner known per se, to the conveyor 14 while the latter is in continuous operation. Alternate fish are fed from the one side of the conveyor via the branch path 10a and a sliding hatch 15 to transverse transport containers 16 on the conveyor 14. The unoccupied, intermediate transport containers 16 are later fed fish from the other side of the conveyor via the branch path 10b and a sliding hatch 17. All the fish are supplied in a desired manner to the containers 16 on the conveyor 14 with the head first and with the belly turned upwards so that alternate fish of the conveyor have the head turned the same way while the remaining fish have the head turned the opposite way. In practice, for example, there can be supplied, at the same time, a group of 20 fish admitted via each of the sliding hatches 15 and 17 to be uniformly distributed to alternate transport containers within a region of 40 transport containers on the conveyor. The transfer to the conveyor occurs respectively from the sliding hatch 15 with 20 fish admitted in a first region of the track of the conveyor to alternate transport containers and later from the sliding hatch 17 with 20 fish admitted in a second region of the track of the conveyor to the unoccupied, intermediate transport containers.

The fish can be fed in each branch path at a speed of 400 fish per minute, that is to say with 20 separate chutes 20 fish can be transferred at the same time per feeding operation and with 20 feeding operations per minute at each sliding hatch.

As shown in FIG. 2, the machine comprises the first conveyor 14 and a second conveyor 18, together with a box conveyor 19. The first conveyor 14 has its active run 14a directed upwards and the second conveyor 18 has its active run 18a directed downwards and the box conveyor 19 has its active run directed upwards. The active downwardly directed run 18a of the second conveyor 18 has the one end projecting a distance inwardly above the first conveyor and the other end projecting a distance inwardly above the box conveyor 19.

The first conveyor 14 comprises two parallel chains 20 (of which only the one is shown in the drawing), which are driven at the one end of the conveyor via a pair of drive wheels 21 and at the opposite end pass over a pair of corresponding idler wheels 22. The drive wheels 21 are driven at a speed 2a from a drive motor 23 having a step-free regulatable driving speed, via a drive chain 24. The speed 2a for the conveyor can correspond, for example, to an advancing speed of 800 fish per minute which corresponds to a deposition of 10 fish per box at a loading speed of 80 boxes per minute.

Between the chains 20 there are shown in FIG. 3 fixed rails 25 which support their respective holders 26 of plastic and in each holder there are designed four pocket-forming, transversely extending transport containers 16. The transport containers 16 have openings directed upwards into the active run 14a of the conveyor 14 and have a division distance between the containers approximately twice as large as the thickness of the fish. The fish are received to lie freely in their respective transport containers 16, but, nevertheless, do not have better fits than that the fish — for all relevant fish sizes — can be secured in place in a desired position with the belly directed upwards. The transport containers 16 are formed between sideways extending rows of tooth shaped projections 16a and longitudinally extending grooves 26a are defined between the projections 16a. The grooves 26a have greater depths than transverse beds 16b which form the pocket-forming transport containers' bottom portions between the projections 16a.

As is evident from FIG. 3, there projects longitudinally inwards into each of the grooves 26a of the holders 26 a pointed, wedge-shaped fork end 27a of a stationarily arranged guide means or arrangement 27 which is positioned at the end of the upper run 14a of the first conveyor 14. The wedge-shaped fork ends 27a of the guide arrangement, which project inwardly into the holders 26 just below the bed 16b and just above the bottom of the grooves 26a, are adapted to engage the under side of the fish one after the other and lift them out of the bed in the pocket-forming transport containers. The guide arrangement 27 extends from the pointed end 27a first obliquely upwards and thereafter convexly curved as shown at 27b and further over into a horizontal guide surface 27c having a terminating edge 27d arranged just above the advancing path of the boxes on the box conveyor 19 (FIG. 4).

The second conveyor 18 comprises two parallel chains 28 (of which only the one is shown in the drawings), which are driven at one end of the conveyor via a pair of drive wheels 29 and at the opposite end pass over a pair of corresponding idler wheels 30. The drive wheels 29 are driven at a speed a from the said drive motor 23 via a drive chain 31, that is to say at a speed a which is only a half of the speed 2a of the conveyor 14.

Between the chains there are fixed transversely extending rods 32 which each support, in pivotably mounted fashion, a weight-forming cross-piece 33 which is provided with a series of parallel, outwardly extending butt-ended blades 34. In the lower, active run 18a of the conveyor 18, the cross-pieces 33 with associated catch devices in the form of blades 34 are adapted to assume a free downwardly suspended position. In the upper run 18b of the conveyor 18, the cross-pieces 33 with blades 34 are adapted to assume an obliquely upwardly and rearwardly directed position. On being led around the drive wheels 29, the cross-pieces 33 with blades 34 are adapted to be tilted over into a more or less horizontal outwardly directed position with supporting abutment against a concave stationary guide plate or element 35 and are gradually led via the lower edge of the guide plate into controlled engagement with their respective fish in an associated transport container 16 on the conveyor 14. Gradually as the blades 34 leave the supporting abutment at the lower edge 35a of the guide plate 35, the blades 34 are pivoted, as a consequence of the weight of the cross-piece and the blades, inwardly into the holders 26 in the grooves 26a to abut against an associated fish. At the same time, the chains 28 are brought along the guide rails in a locally oblique upwardly extending path in a region above fork ends 27a of the guide arrangement 27.

As a consequence of the conveyor 18 having only half the speed of the conveyor 14, there can be achieved an accurately controlled introduction of the blades 34 behind an associated fish in the associated transport container and a raising of the fish, one after the other, by means of the guide arrangement 27 upwardly in a path outside the path of movement of the transport containers 16 of the conveyor 14. Gradually as fork ends 27a of the guide arrangement 27 lift the fish upwards and outwards from the pocket-forming transport container, as is shown in FIG. 3, the fish are packed together to a desired degree and each fish is lightly clamped together to abut against an advanced set of blades 34 which, in turn, are clamped against a fish situated in front. As a consequence of the lower speed of the conveyor 18 compared with that of conveyor 14, there is attained a controlled packing together of the fish on the guide arrangement 27, with a favorably light clamping together of the fish between the series of blades 34.

By means of check elements in the form of guide or control pins 37 (FIG. 4) secured at a fixed distance b to a chain drive 38, there is defined within the region b between the guide pins 37 a group of fish lightly clamped together and associated blades, having a breadth substantially corresponding to the internal breadth of the associated box. Where fish are sorted out to a size corresponding to six fish per box, the desired six fish are defined within said region b. By means of the guide pins 37, the fish are held collected in desired pushed-together groups and are advanced by the conveyor 18 and the cooperating guide pins 37 in groups along the top of the guide arrangement 27 to the termination edge 27d, where each group is released, one after the other, from the conveyor 18 by the swinging away of a leading guide pin 37 and is pushed by means of an oscillating arm 39 downwardly into a box disposed below which is advanced by the box conveyor 19.

The box guide 11 (FIG. 2) extends with a portion 11a vertically downwards and is deflected with a curved portion (at 11b) concavely inwards towards and extends with a horizontal portion (at 11c) directly into the upper, active run 19a of the box conveyor 19. Each box of a series of boxes is held in the conveyor 19 by a push element 40 (FIG. 4) secured to a chain 41. The chain 41 is driven synchronously by the chain drive 38 via a drive wheel 42 at the one end and extends via a guide wheel 43 at the opposite end. From the conveyor 19, the filled boxes pass over on the slide plate 44 and are further transported on this by means of two oppositely disposed transport cords 45 (only the one is shown in the drawings).

In the embodiment described, there is employed an advancing speed of 2a on the conveyor 14, corresponding to a forward feeding of 800 fish per minute and with a box-loading speed of 80 boxes per minute based on 10 fish in each box in a single box layer. However, there is employed only half the advancing speed (the speed a) on the conveyor 18. This means that one can ensure a controlled introduction of the blades 34 of the conveyor 18 into the transport containers 16 of the conveyor 14. Furthermore, this means that one can achieve a controlled packing together of the fish and a light clamping together of the fish in the conveyor 18, there being used a relatively large distance between the pocket-forming transport containers 16 on the conveyor 14, while on the conveyor 18 one gets a packing together of the fish in a lightly clamped condition within a region b which corresponds or substantially corresponds to the inner breadth of the box.

The machine is designed to be employed for fish of various sorting sizes. For example, there can be conveyed, in a predetermined first time period, fish of a sorting size of 10 fish per box and thereafter, one after the other, the various additional sorting sizes, for example, from nine fish down to five fish per box. With the larger fish, for example, of sorting sizes of five fish per box, there are packed together five fish within the same region b as for the six fish in the afore-described production process and this means that in order to load 80 boxes per minute of the size five fish per box one can manage with half the advancing speed, that is to say with a speed a on the conveyor 14, while the conveyor 18 is advanced with a speed ½a. Consequently, by maintaining a loading speed of 80 boxes per minute for all sorting sizes, one can maintain a constant speed of the box conveyor 19 and only regulate the speeds of the conveyors 14 and 18 in accordance with the sorting size. The speed for feeding the conveyor 14 can be regulated in step with the speed of the conveyor 14 by means of control devices which are actuated mechanically or in another way via the conveyor 14.

Alternatively, one can have the same speed or substantially the same speed for the conveyor 14 both for large and for small fish, for example, based on a speed 2a' which is somewhat less than the afore-mentioned speed 2a so that one gets a loading speed of, for example, less than 70 boxes per minute for the smallest fish and a loading speed of over 70 boxes per minute for the largest fish.

What we claim is:

1. A machine for loading fish in boxes which comprises:
    (a) a first conveyor supporting a series of transport containers thereon, said first conveyor serving to transfer fish sideways while each is disposed in its respective transport container in a preselected position with the heads of fish in adjacent containers facing in opposite directions and the bellies directed upwards;
    (b) cooperating feed means for supplying fish to said transport containers of said first conveyor and a second conveyor for receiving said fish from said first conveyor, said second conveyor having a series of catch devices each adapted to engage its respective fish and effect transfer thereof to an associated box for deposition therein;
    (c) means for driving said first and second conveyors at a uniform speed in a continuous circulatory movement, the relative disposition of said conveyors being such that a local region of the path of movement of said catch devices of said second conveyor coincides with a local region of the path of movement of said transport containers of said first conveyor enabling said catch devices to engage their respective fish in their respective transport containers one after each other; and
    (d) cooperating, co-travelling check elements adapted to cause said fish to be retained on said second conveyor in groups between corresponding groups of catch devices within a preselected region of the path of movement of said second conveyor between a first position in which the fish are lightly clamped together between the catch devices and a second position in which a group of fish can be transferred to an associated box.

2. The machine of claim 1, wherein the speed of the second conveyor is approximately half the speed of the first conveyor so as to ensure a controlled introduction of the catch devices into the transport containers accompanied by a controlled packing together of the fish on the second conveyor.

3. The machine of claim 1, wherein the second conveyor consists of two parallel chains supporting the catch devices in a freely pivotable manner about horizontal axes extending transversely of the longitudinal direction of said chains, said catch devices in their path of movement just in front of the region where they are introduced into the path of movement of the transport containers being mechanically guided along a guide device whereby each catch device can be introduced into its respective transport container in an accurately controlled manner.

4. The machine of claim 3, wherein the guide device is of concavely curved form.

5. The machine of claim 1, wherein the transport containers of the first conveyor are bounded in the lateral direction of the conveyor between tooth-shaped projections and bottom-forming beds for the fish and in the longitudinal direction of the conveyor there are defined between the tooth-shaped projections and the bottom-forming beds guide grooves which project below said bottom-forming beds for the reception of pointed, fork ends of a stationary guide arrangement for lifting the fish out of the path of movement of the transport containers and leading said fish a distance along the path of movement of the catch devices while lightly clamped together between said catch devices.

6. The machine of claim 5, wherein the transport containers are combined in groups in common holders.

7. The machine of claim 5, wherein the tooth-shaped projections are capable of exerting a pushing force causing the fish to be lifted out of the transport containers and the catch devices project freely and pivotably downwards between the associated fish.

8. The machine of claim 1, wherein the check elements are secured to a chain drive which runs synchronously with a box conveyor for leading boxes forwardly to and beyond the second position where the group of fish can be transferred to the associated box, the chain drive at the one end leading the check element in the first position into locking engagement with an associated catch device and at the opposite end leading the check element in the second position out of locking engagement with the associated catch device.

9. The machine of claim 8, wherein an oscillating arm which is driven synchronously with the box conveyor and the chain drive for the check elements are adapted to expel the fish from the catch devices in the second position so that the fish fall into place in their associated boxes.

10. A machine for loading fish in boxes comprising
a first conveyor having a plurality of holders thereon, each said holder having a plurality of pocket-forming containers for receiving fish therein;
a second conveyor opposite to said first conveyor, said second conveyor having a plurality of pivotally mounted blades thereon for travel in an endless path, said blades being disposed for coextensive travel with said holders in a portion of said endless path, each said blade being disposed to project into a respective one of said containers during coextensive travel of said blades with said holders;
a guide means projecting into the path of said holders to guide the fish out of said holders during travel of said holders in said portion of said endless path and with said blades in alternating clamping engagement with the fish;
a third conveyor opposite said second conveyor and aligned with said first conveyor, said third conveyor having elements for conveying a series of boxes thereon; and
a plurality of control pins disposed in predetermined spaced apart relation in an endless path, each pair of adjacent pins being disposed to selectively engage spaced apart blades of a respective group of said blades to maintain said group of blades in clamping engagement with the fish therebetween and to disengage from said spaced apart blades to permit depositing of the fish from said group of blades into a box on said third conveyor.

11. A machine as set forth in claim 10 wherein said conveyors are horizontally disposed.

12. A machine as set forth in claim 10 wherein said pair of adjacent pins are spaced apart a distance corresponding to the inner breadth of a box.

13. A machine as set forth in claim 10 wherein each said group of blades has a variable number for a given spaced relation of said pins in dependence on the size of the fish clamped therebetween.

14. A machine as set forth in claim 10 which further comprises means for driving said second conveyor at one-half the speed of said first conveyor.

15. A machine as set forth in claim 10 which further comprises a guide plate for guiding each blade into a respective container at a forward end of said endless path portion.

16. A machine as set forth in claim 15 wherein said guide plate is a concave stationary plate.

17. A machine as set forth in claim 10 wherein each holder has a plurality of rows of tooth shaped projections to define said containers therebetween and a plurality of longitudinally extending grooves between said projections, and wherein said guide means has a wedge-shaped fork end for extending into said grooves to guide the fish out of said containers between said projections.

18. A machine as set forth in claim 10 which further comprises an oscillating arm opposite said third conveyor for pushing the fish from between said group of blades into a box on said third conveyor.

* * * * *